Oct. 24, 1939.     J. W. BRISCOE     2,176,986
BUILDING CONSTRUCTION
Original Filed Dec. 27, 1937     2 Sheets-Sheet 1

INVENTOR.
J. W. BRISCOE
BY
ATTORNEY

Oct. 24, 1939.  J. W. BRISCOE  2,176,986
BUILDING CONSTRUCTION
Original Filed Dec. 27, 1937  2 Sheets-Sheet 2
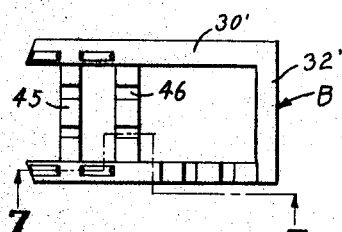
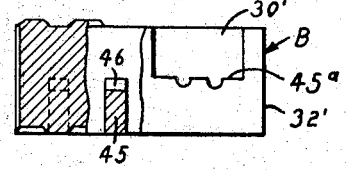
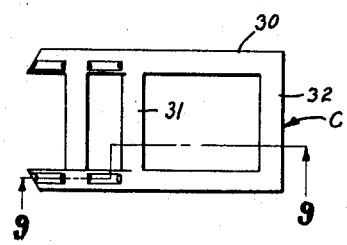
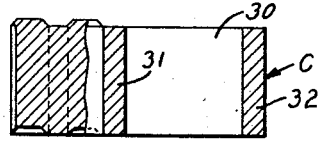
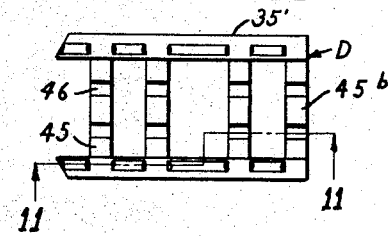
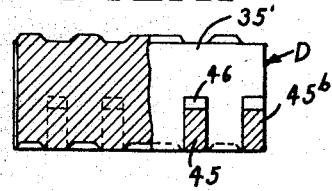
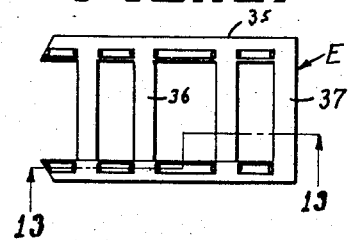
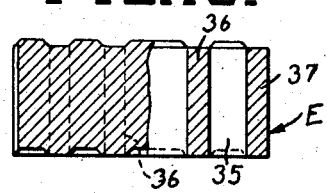
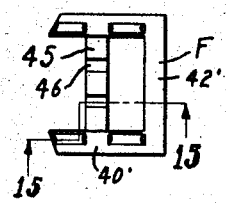
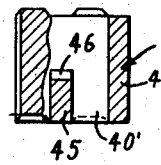
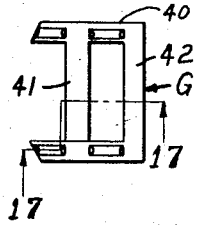
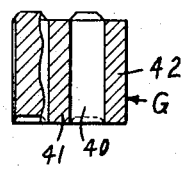
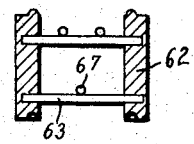
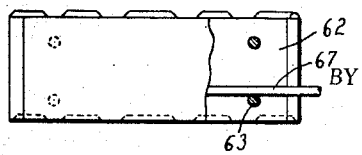
INVENTOR.
J. W. BRISCOE
BY
ATTORNEY Patented Oct. 24, 1939

2,176,986

UNITED STATES PATENT OFFICE 2,176,986

BUILDING CONSTRUCTION

James W. Briscoe, Los Angeles, Calif.

Application December 27, 1937, Serial No. 181,809
Renewed March 27, 1939

7 Claims. (Cl. 72—30)

This invention relates to a concrete block for use in building construction.

The general object of the invention is to provide an improved building block including side and web members and wherein novel means is provided for bonding a wall made from such blocks.

A more specific object of the invention is to provide an improved bonded concrete block wall.

Other objects and the advantages of this invention will be apparent from the following description taken in connection with the accompanying drawings, wherein:

Fig. 6 is a top plan view showing one type of corner block;

Fig. 7 is a section taken on line 7—7 Fig. 6;

Fig. 8 is a top plan view showing a modified corner block;

Fig. 9 is a section taken on line 9—9 Fig. 8;

Fig. 10 is a top plan view showing another modification;

Fig. 11 is a section taken on line 11—11 Fig. 10;

Fig. 12 is a top plan view of another block;

Fig. 13 is a section taken on line 13—13 Fig. 12;

Fig. 14 is a top plan view of another modified block;

Fig. 15 is a section taken on line 15—15 Fig. 14;

Fig. 16 is a top plan view of a further modified block;

Fig. 17 is a section taken on line 17—17 Fig. 16;

Fig. 18 is a central sectional view of another modified block;

Fig. 19 is a side elevation, partly in section, of the block shown in Fig. 18;

Figure 1:
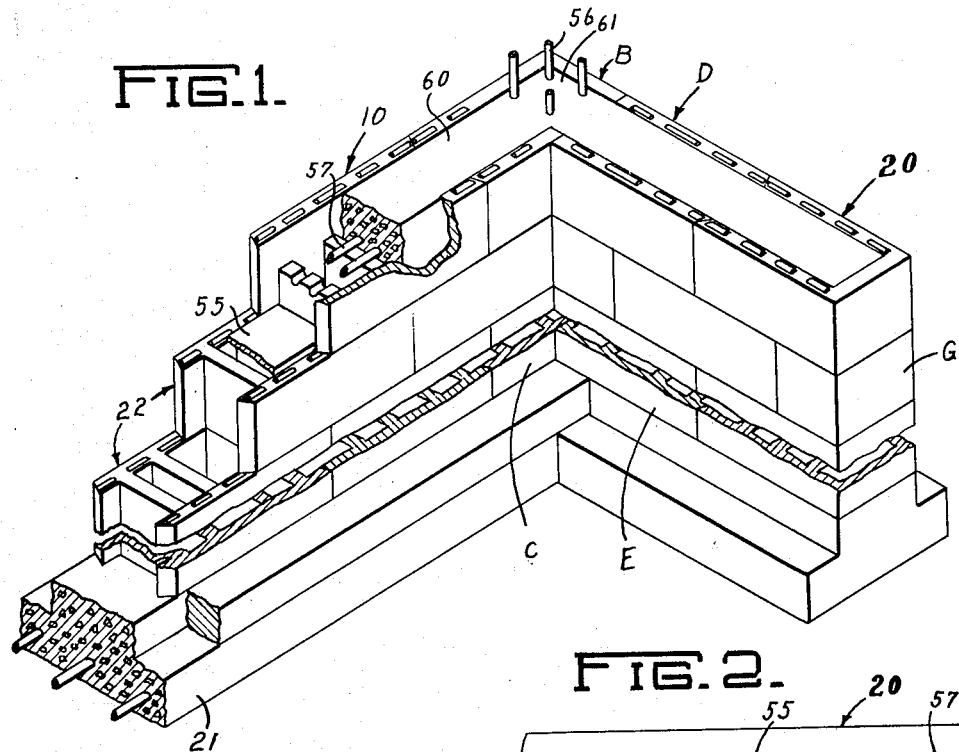
Fig. 1 is a fragmentary perspective view of a concrete block wall embodying the features of my invention.
Figure 2:
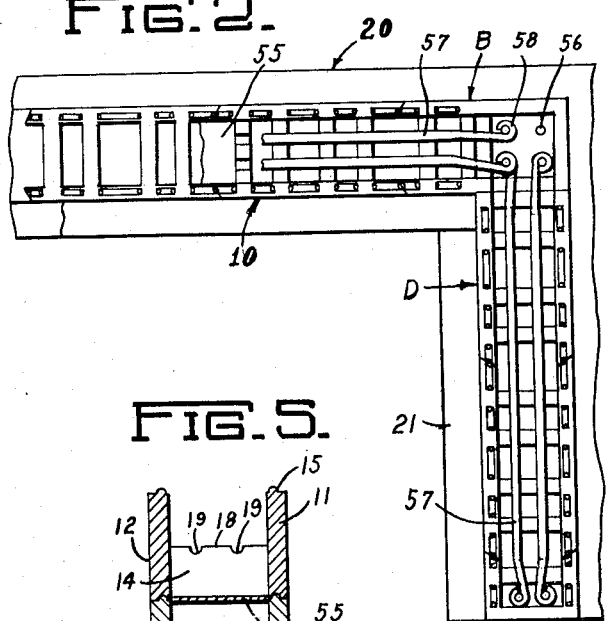
Fig. 2 is a top plan view of a portion of the wall during one stage of its manufacture.
Figure 3:
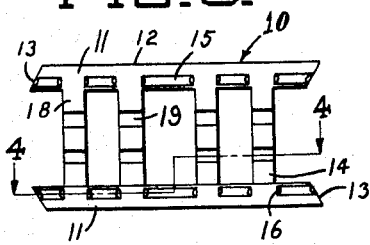
Fig. 3 is a top plan view showing one of my improved blocks.
Figure 4:
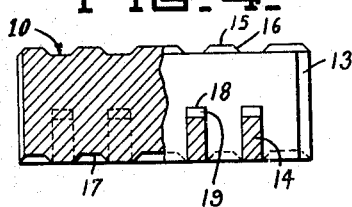
Fig. 4 is a section taken on line 4—4 Fig. 3.
Figure 5:
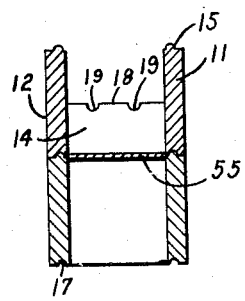
Fig. 5 is a sectional view showing two superimposed blocks.

Referring to the drawings by reference characters I have shown my invention as embodied in a concrete block which is indicated generally at 10.

As shown the block comprises an integral body having a pair of spaced parallel side members 11. These side members include inner and outer surfaces 12 and have bevelled ends 13. The opposite ends on each side are disposed in parallel planes and the side members are united by a plurality of webs 14 which are parallel to each other and may be of less thickness than that of the side members 11.

I show each of the side members as provided with a plurality of longitudinally extending beads 15 on the top thereof. These beads 15 are preferably semi-cylindrical as shown and have bevelled ends 16. The beads 15 are interrupted in line with the webs 14 and as shown are spaced closer to the inner face of the side members than to the outer face thereof. The side members 11 have grooves 17 on the bottom thereof which are semi-cylindrical in shape and have bevelled ends and which are interrupted in line with the webs. The grooves 17 like the beads 15 are spaced closer to the inner face of the side members 11 than to the outer face thereof.

The top of the side members 11 and the portion between the ends of the beads are all in one plane and the bottom of the sides 12, the entire bottom of the webs 14 and the portion between the ends of the grooves 17 are also in one plane which is parallel to the last mentioned plane. The tops 18 of the webs are in one plane which is shown as disposed substantially midway between the top and bottom of the side members 11 and the webs are shown as provided with spaced notches 19 to receive reinforcing members to be presently described.

The concrete block just described is especially adapted for use in building structures for the purpose of bonding a wall such as that indicated generally at 20 in the accompanying drawings. As shown this wall includes a foundation 21 and includes a plurality of courses of blocks which are indicated generally at 22. The blocks forming the courses of the wall below the top course may be made of the type shown in my prior patent, No. 2,044,051, granted June 16, 1936. The construction of the blocks shown in the patent mentioned is such that the blocks indicated at 10 in the accompanying drawings will fit thereon and can be built into a wall.

In the drawings I have shown my invention in a wall construction which includes a corner. In building such a construction in the lower courses I employ blocks such as are indicated by the letters C, E and G in the accompanying drawings.

The block C in Figs. 8 and 9 includes side members 30 having full height webs 31 and having an end 32.

The block E includes side members 35, webs 36 and an end member 37. This block is similar to the block C and includes an additional web.

The block G shown in Figs. 16 and 17 includes side members 40, a single web member 41, and an end 42.

The blocks C, E and G are employed in a wall at the locations indicated in Fig. 1 to form the completed wall.

The blocks shown at B, D and F are similar to the blocks C, E and G respectively in all points except that the webs 45 in the blocks B, D and F extend half-way along the sides and that one side in the block B is reduced in height as 45a and the end 45b in block D has its end reduced in height, and that these portions are provided with the notches 46 similar to the notches 19, previously described.

The parts of blocks B, D and F which are similar to parts in the blocks C, E and G are designated by similarly primed reference numerals.

According to my invention the wall is built to a suitable height and then the upper course is laid from the blocks shown in Figs. 3, 6, 10 and 14. Prior to the laying of this last course I place a sheet 55 of copper or other material to form a bottom for the cavities in the blocks.

The blocks are laid throughout the wall with the cavities in alignment and in the end cavities I arrange vertically extending reinforcing members 56. The notches in the blocks A, B, D and F also receive reinforcing members 57 which are preferably provided with hooked portions 58 engaged about the vertical members 56. Concrete is then poured into the cavities of the upper course. It is held in place by the sheet 55 and engages the reinforcements 57 and 56. The fact that the webs in the upper course are short provides a longitudinally extending chamber which when filled with concrete forms a continuous horizontal bond 60 which is integrally united with the vertically extending bond 61 surrounding the reinforcements 56. In this manner I provide added strength to the wall made from my blocks and accomplish this at a minimum of expense.

The block shown in Figs. 18 and 19 includes side walls 62 similar in all respects to the side walls on the blocks previously described. In this block the side walls 62 are secured together by spaced reinforcing rods 63 which are used in place of the webs.

Figure 20:
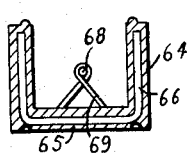
Fig. 20 is a central sectional view of a further modified block.
Figure 21:
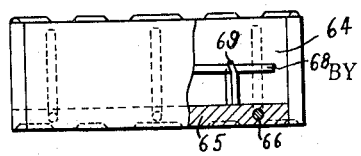
Fig. 21 is a side elevation, partly in section, of the block shown in Fig. 20.

The block shown in Figs. 20 and 21 includes side walls 64 similar to those previously described. The side walls 64 are connected together by a bottom 65 which extends the full length of the block and has U-shaped reinforcing rods 66 extending through the bottom and the side walls 64.

When the block shown in Figs. 18 and 19 is employed a sheet of copper is arranged similar to the sheet 55 previously described and the longitudinally extending horizontal bond 60 is arranged on the sheet and of course extends the full length of the cavity. Reinforcing rods indicated at 67 in Fig. 19 may be employed in this horizontal bond.

When the horizontal bond is to be made of blocks shown in Figs. 20 and 21 a reinforcing member 68 may be arranged therein and may be supported by a wire member shown at 69. The horizontal chamber provided by the block is filled with concrete and thus the horizontal bond is secured.

From the foregoing description it will be apparent that I have invented a novel block and building construction which may be economically manufactured and which is highly efficient for the intended purpose.

Having thus described my invention I claim:

1. A concrete block comprising a body having a pair of spaced parallel side members, said side members having parallel sides, a plurality of webs connecting said side members, said webs being parallel to each other, each of said side members having a plurality of longitudinally extending beads on the top thereof, said side members having grooves in the bottom thereof, the tops of said side members being in one plane, the bottom of said side members being in one plane parallel to the last mentioned plane, the top of said webs being in one plane disposed below the top of said side members, said webs having a notch in their upper edge.

2. A concrete block comprising a body having a pair of spaced parallel side members, said side members having parallel sides and bevelled ends, the opposite ends on each side being disposed in parallel planes, a plurality of webs connecting said side members, said webs being parallel to each other, each of said side members having a plurality of longitudinally extending beads on the top thereof, said beads being interrupted in line with said webs, said side members having grooves in the bottom thereof, said grooves being interrupted in line with said webs, the tops of said side members being in one plane, the bottom of said side members being in one plane parallel to the last mentioned plane, the top of said webs being in one plane disposed below the top of said side members.

3. A concrete block comprising an integral body having a pair of spaced parallel side members, said side members having parallel sides and having bevelled ends, the opposed ends on each side being disposed in parallel planes, a plurality of webs connecting said side members, said webs being parallel to each other and having less thickness than the thickness of said side members, each of said side members having a plurality of longitudinal extending beads on the top thereof, said beads being semi-cylindrical in shape and having bevelled ends, said beads being interrupted in line with said webs, said beads being spaced closer to the inner face of said side members than to the outer face thereof, said side members having grooves on the bottom thereof, said grooves being semi-cylindrical in shape and having bevelled ends, said grooves being interrupted in line with said webs, said grooves being spaced closer to the inner face of said side members than to the outer face thereof, the top of said side members being in one plane, the bottom of said sides, the entire bottom of the webs, and the portion between the ends of the grooves being in one plane parallel to said last mentioned plane, the top of said webs being in a plane midway between top and bottom of the side members, each of said webs having slots in the top thereof.

4. A wall comprising a plurality of hollow plastic blocks, each having parallel end portions and parallel front and back portions, one end of each block including a projecting portion and the other end of each block including a recessed portion, said projecting portion being of a shape complemental to the shape of the recessed portion said end portions being in direct engagement and said projecting portions directly fitting the walls of said recessed portions so that the entire ends of each block engage the entire ends of the adjacent blocks, said blocks having a plurality of vertical cavities therein defined by transversely extending webs integral with the blocks, said webs extending upwardly from the bottom of the blocks and terminating below the top of the blocks to form a horizontal cavity intersecting the vertical cavities in the blocks and a filling of concrete in said horizontal cavity.

5. In a building construction, a foundation, a wall comprising a plurality of hollow interlocking plastic blocks arranged upon said foundation, said blocks having transverse webs, the top course of said wall including blocks having transverse webs which last mentioned webs terminate below the side walls and said last mentioned blocks to form a longitudinal chamber, means closing the bottom of the cavities in the top course of blocks, reinforcing members on the top of the webs in the upper course of blocks, a concrete filling in said upper course and engaging said closing means, said last mentioned filling extending through said longitudinal chamber and surrounding the reinforcement therein to form a bond.

6. In a building construction, a foundation, a wall comprising a plurality of hollow interlocking plastic blocks arranged upon said foundation, said blocks having transverse webs, said blocks being staggered with the cavities formed by said webs in alignment, reinforcing members embedded in said foundation and extending upwardly through vertically spaced cavities in the blocks, a filling of concrete in the cavities through which said reinforcing members extend to form a vertical bond, the top courses of said wall including blocks having transverse webs which last mentioned webs terminate below the side walls and said last mentioned blocks to form a longitudinal chamber, a sheet member closing the bottom of the cavities in the top course of blocks, reinforcing members on the top of the webs in the upper course of blocks, a concrete filling in said upper course and engaging said sheet member, said last mentioned filling extending through said longitudinal chamber and surrounding the reinforcement therein to form a horizontal bond, said horizontal bond being integrally united to said vertical bond.

7. A concrete block comprising a body having a pair of spaced parallel side members, said side members having parallel sides, the ends of the sides at one end of the block being complemental to the ends of the sides at the other end of the block, a plurality of webs connecting said side members, said webs being parallel to each other, the tops of said side members being complemental to the bottoms of the side members, the tops of said side members being in one plane, the bottoms of said side members and the entire bottoms of said webs all being in one plane parallel to the last mentioned plane, the top of said webs being in one plane disposed below the plane of the top of said side members.

JAMES W. BRISCOE.